A. H. HINDLE, S. W. SAVAGE, A. LIDDLE AND A. E. DABBS.
CAGE FOR ROLLER OR BALL BEARINGS.
APPLICATION FILED AUG. 12, 1919.
1,358,848.
Patented Nov. 16, 1920.
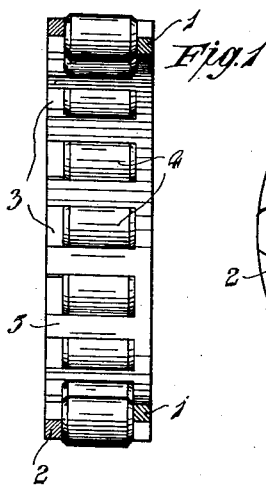
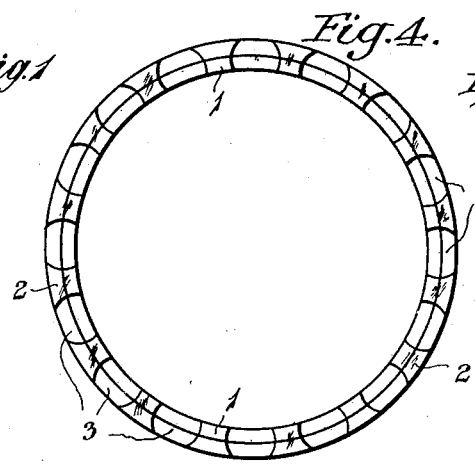
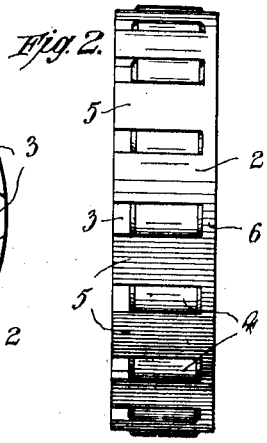
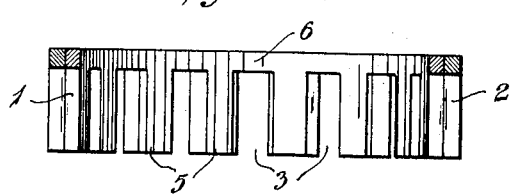
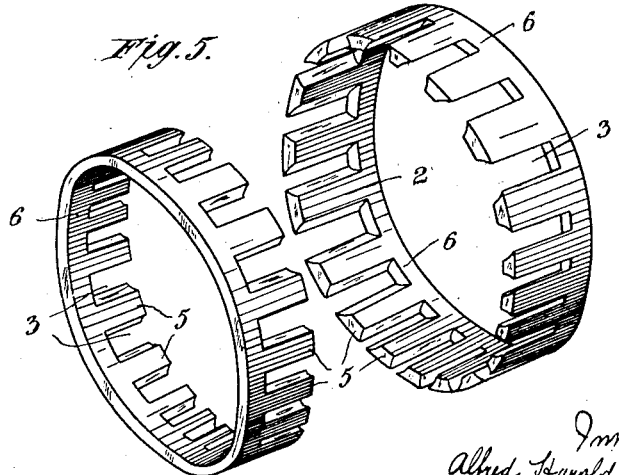

UNITED STATES PATENT OFFICE.

ALFRED HAROLD HINDLE, OF BIRMINGHAM, AND STANLEY WHITBY SAVAGE, ABSALOM LIDDLE, AND ALBERT EDWARD DABBS, OF MANCHESTER, ENGLAND, ASSIGNORS OF ONE-HALF TO JOHN GEORGE WILLIAM GRUBAN, OF LONDON, ENGLAND.

CAGE FOR ROLLER OR BALL BEARINGS.

1,358,848.          Specification of Letters Patent.    Patented Nov. 16, 1920.

Application filed August 12, 1919. Serial No. 317,096.

*To all whom it may concern:*

Be it known that we, ALFRED HAROLD HINDLE, of 51 Sandford road, Moseley, Birmingham, in the county of Warwick, England, engineer; STANLEY WHITBY SAVAGE, of 55 Brook road, Chorlton-cum-Hardy, Manchester, in the county of Lancaster, England, engineer; ABSALOM LIDDLE, of 3 King's road, Alexandra Road south, Manchester aforesaid, provision merchant, and ALBERT EDWARD DABBS, of 19 Rowan avenue, Whalley Range, Manchester aforesaid, import manager, have invented certain new and useful Improvements in Cages for Roller or Ball Bearings; and we do hereby declare that the following is a full, clear, and exact description of the same.

Our invention comprises improvements in cages for roller or ball bearings and refers to that class of such which include a pair of concentric rings each having a series of openings arranged in register and which are adapted to carry balls or rollers and to hold them at suitable distances apart within the bearing; the object of the present invention being to provide an improved and simpler cage for this purpose.

In this class of cage it has been proposed to provide part circular holes in the rings, the axes of said holes being disposed radially with respect to the rings, the holes in both rings being near the adjacent edges of the rings and being open at the edges of the rings whereby a series of registering tongues or laps are formed between which the balls are held.

According to this invention the cage comprises a pair of concentrically disposed rings each having longitudinally disposed slots each of which is open to one edge of the ring but closed at the opposite end, the rings being arranged with said slots in register, each pair of registering slots having the open end of one slot at one end of the cage and the open end of the other slot at the other end of the cage so that the two rings will together serve to hold and retain rollers or balls in place with the closed ends of the slots preventing axial movement of the rollers or balls in either direction; the lateral edges of the outer ring having inwardly disposed curved faces, while the lateral edges of the inner ring have outwardly disposed curved faces so that the curved faces in the rings correspond with the balls or rollers and serve to partially inclose them.

Referring to the drawings:—

Figure 1. is a view in sectional side elevation of a cage with rollers in position.

Fig. 2. is an end view corresponding with Fig. 1.

Figs. 3 and 4. are views in sectional side elevation and end elevation respectively showing a pair of rings as assembled for drilling.

Fig. 5. is a perspective view showing the outer and inner rings.

In the construction illustrated each of the rings 1, 2 may be made from a short length of tubing or a casting and the openings 3 for receiving the rollers or balls are formed by circular cutters having a diameter corresponding with that of the roller 4 or ball to be held. In practice the two rings 1 and 2 may be placed one inside the other as shown in Figs. 3 and 4 and the openings 3 simultaneously cut in the two rings, the center of the cutter corresponding or approximately corresponding with the inner periphery of the outer ring 2 so that the roller 4 or ball is partially surrounded by each ring and is thus held against radial movement either toward or away from the center of the cage.

Each member 1, 2 of the cage thus consists of a ring having projections 5 at one edge, and in practice the two rings are placed one within the other with their unbroken edges 6 at opposite sides, the rollers 4 or balls being thus inclosed between them.

The rings may be made of any suitable material, preferably brass or a similar non-ferrous metal.

If desired the rings may be pressed from sheet metal in which case the openings may be machined out in manner previously described, or the projection may be cut out of the blank and bent with the ring when the openings would be finally machined to shape.

When the cage has been assembled, the two rings may be locked together by any suitable means such as radial grub screws screwing into the overlapping projections 5. Alternatively the rings may be prevented from endwise displacement by a member or members associated with the housing within which such bearings are usually supported.

In drilling the holes forming the slots between the projections 5, a rotary circular cutter having a nose shaped to give a spherical end to the cut may be used when the cage is intended to be used for balls.

What we claim then is:—

A cage for the rotary anti-friction members of bearings comprising a pair of concentric rings, one disposed within the other, lateral projections on the said rings disposed in opposite directions, inwardly disposed curved faces on the lateral edges of the said projections on the outer member, outwardly disposed curved faces on the lateral edges of the projections of the inner member, the curvature approximately corresponding with that of the rotary members.

In testimony whereof we affix our signatures in presence of two witnesses.

ALFRED HAROLD HINDLE.
STANLEY WHITBY SAVAGE.
ABSALOM LIDDLE.
ALBERT EDWARD DABBS.

Witnesses:
  JAMES H. CARR,
  T. G. CECIL BRITT.